United States Patent [19]

Chung et al.

[11] Patent Number: 4,653,585
[45] Date of Patent: Mar. 31, 1987

[54] OIL RESERVOIR PERMEABILITY CONTROL

[75] Inventors: Harold S. Chung, Dallas; Krishnaswamy Sampath, Carollton, both of Tex.; Frederick C. Schwab, Metuchen, N.J.

[73] Assignee: Mobil Oil Corporation, New York, N.Y.

[21] Appl. No.: 696,952

[22] Filed: Jan. 31, 1985

[51] Int. Cl.$^4$ .............................................. E21B 43/16
[52] U.S. Cl. ...................................... 166/275; 166/292
[58] Field of Search ............... 166/275, 273, 274, 292; 252/8.55 D

[56] References Cited

U.S. PATENT DOCUMENTS

| | | | |
|---|---|---|---|
| 3,867,295 | 2/1975 | Schwab et al. | 252/33.4 |
| 3,954,915 | 5/1976 | Schwab et al. | 260/887 |
| 3,984,333 | 10/1976 | van de Kraats et al. | 166/275 |
| 4,110,232 | 8/1973 | Schwab et al. | 252/8.55 B |
| 4,120,801 | 10/1978 | Chen et al. | 252/8.55 D |
| 4,222,881 | 9/1980 | Byham et al. | 252/8.55 D |
| 4,505,827 | 3/1985 | Rose et al. | 252/8.55 D |

Primary Examiner—Stephen J. Novosad
Assistant Examiner—Bruce M. Kisliuk
Attorney, Agent, or Firm—A. J. McKillop; M. G. Gilman; C. A. Malone

[57] ABSTRACT

The permeability of a subterranean oil-bearing formation is controlled by the injection of an aqueous solution of a block copolymer containing polar and non-polar segments, with the polar segments generally making up at least 50 percent, usually 60 to 99 percent, of the copolymer. The polar segments are derived from an alkylene oxide and the non-polar segments from styrene or an alkyl styrene either by itself or with a diene. The copolymers may be cross-linked with polyvalent metal ions such as chromium and are normally used in solution concentrations of 1000–10,000 ppm. Diene units in the non-polar segment may be hydrogenated to reduce residual unsaturation and solubilizing functional groups such as sulfonate or hydroxyl may be present to improve water solubility.

16 Claims, No Drawings

OIL RESERVOIR PERMEABILITY CONTROL

FIELD OF THE INVENTION

This invention relates to the control of permeability in subterranean oil-bearing formations.

BACKGROUND OF THE INVENTION

In the production of oil from subterranean oil reservoirs by various flooding techniques, especially waterflooding, it has become a common expedient to add various polymeric thickening agents to the water in order to increase its mobility to a point where it approaches that of the crude oil which is to be displaced so as to improve the displacement of the oil from the reservoir. Use of polymers for this purpose is often stated to be for mobility control.

Another problem which arises in the various flooding processes is that different strata or zones in the reservoir often possess different permeabilities so that displacing fluids enter the high permeability of "thief" zones in preference to zones of lower permeability where significant quantities of oil may be left unless measures are taken to plug the high permeability zones wholly or partly and so divert the displacing fluid into the low permeability zones. Mechanical isolation of the thief zones has been tried but vertical communication among reservoir strata often renders such measures ineffective. Physical plugging of the high permeability zones by cements and solid slurries has also been attempted with varying degrees of success but here, the most serious drawback is the possibility of permanently closing still productive horizons.

From these early experiences, the desirability of designing a viscous slug capable of sealing off the most permeable layers so that the floodwater would be diverted to the underswept, tighter regions of the reservoir, became evident. This led to the use of oil/water emulsions, gels and polymers for controlling the permeability of the formations in a process frequently referred to a "profile control", a reference to control of the vertical permeability profile of the reservoir. Profile control agents which have been proposed have included oil/water emulsions, gels, e.g. lignosulfate gels and polymers, with polymers being the most extensively applied in recent years.

Among the polymers so far examined for improving waterflood conformance are polyacrylamides, polysaccharides, celluloses, furfural-alcohol and acrylic/epoxy resins, silicates and polyisocyanurates. A major part of this work has been conducted with the polyacrylamides, both in their normal, noncrosslinked form as well as in the form of metal complexes, as described, for example, in U.S. Pat. Nos. 4,009,755; 4,069,869 and 4,413,680. In either form, the beneficial effects derived from these polyacrylamides seem to dissipate rapidly due to shear degradation during injection and sensitivity to reservoir brines. To overcome these problems and to achieve deeper penetration into the reservoir, dilute solutions of these polymers have sometimes been injected first and then complexed in situ.

Another group of polymeric thickeners which has received considerable attention for use in improving waterflooding is the polysaccharides, particularly those produced by the action of bacteria of the genus Xanthomonas on carbohydrates. For example, U.S. Pat. Nos. 3,757,863 and 3,383,307 disclose a process for mobility control by the use of polysaccharides. U.S. Pat. Nos. 3,741,307; 4,009,755; 4,069,869 disclose the use of polysaccharides in the control of reservoir permeability. U.S. Pat. No. 4,413,680 describes the use of crosslinked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man made fractures in formations. The use of polyvalent metal ions for cross-linking polysaccharides is also disclosed in U.S. Pat. No. 3,810,882.

The use of various types of block copolymers for mobility control in waterflooding operations is described in U.S. Pat. Nos. 4,110,232, 4,120,801 and 4,222,881, but their use for permeability control has not been suggested.

All the various types of polymer which have been used or proposed for use in permeability control methods have had certain disadvantages either technical or economic in nature. There is therefore a continuing need for different types of polymer which will be effective as permeability control agents in different types of reservoirs.

SUMMARY OF THE INVENTION

According to the present invention, the permeability of the reservoir is controlled by the selective placement within the reservoir of an aqueous solution or dispersion of a block copolymer of the AB or BAB type containing both polar and non-polar blocks. The non-polar blocks are derived from styrene or an alkylstyrene or hydrogenated diene-styrene units and the polar blocks are derived from an alkylene oxide. Generally, the polar blocks will constitute at least 50% by weight of the polymer but in certain cases as little as 30% by weight will be sufficient to ensure that the block copolymer will be swollen by water to form an aqueous gel having the desired properties. Generally, the polar units will constitute 60 to 99, preferably 60 to 80, weight percent of the polymer. The solubility of the polymer may be enhanced by the presence of solubilizing groups such as sulfonate, in either the acid or salt form, i.e. as —$SO_3H$ or —$SO_3M$ where M is a metal, preferably an alkali metal such as sodium, in which cases the proportion of the polar groups in the polymer may be lower than it would otherwise need to be.

DETAILED DESCRIPTION

In a flooding operation for enhancing the production of oil from a subterranean, oil-bearing formation, a flooding liquid, usually water is injected into the subterranean, oil-bearing formation though an injection well which extends from the surface of the earth down into the formation. A production well also extends into the formation at an offset or horizontal distance from the injection so that, as the flooding liquid is injected into the formation through the injection well, it displaces the oil towards the production well, from which it may be recovered. Invariably, more than one injection well and more than one production well will be used in order to cover the oilfield adequately and recovery is maximized; various arrangements of injection and production wells are used to this end, e.g. linear arrangements to form a line drive, five spot, inverted five spot, seven spot, inverted seven spot, all of which is established in practice.

The polymer gels which are suitable for profile control desirably have good gel strength, shear stability and good injectivity. The gel strength is required in order that the polymer will be able to resist the pressures which will be set up in the formation once the polymer has been placed in the formation and the flooding process started; because the flooding process relies on the injection of the flooding liquid at the injection well, substantial pressures acting upon the rear of the gelled polymer plugging the more highly permeable zones may be set up. If the strength of the gelled polymer is insufficient to resist the resulting stresses, it may break up and lose its effectiveness. Shear stability is required because during the injection, the polymer solution will be subjected to shear stresses in the pumping and well equipment and as it moves through the formation. Although shear-thinning behavior is desirable, so that the polymer solution becomes less viscous during the injection process, it should be reversible in nature so that when the shear forces are removed, the gel will revert to its original viscosity and structure, or substantially so, in order that it may then effectively plug the high permeability regions of the formation. Injectivity is, to a certain extent, the inverse of gel strength since gel strength is related to the performance of the polymer as a solid whereas injectivity requires that it should behave as a liquid.

The polymers which are used according to the present invention contain polar blocks and non polar blocks and are of the AB or BAB type. Polymers of the BAB type include the following types:

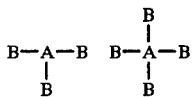

Block copolymers of this type in which the polar segments may be derived from alkylene oxides or sulfides are described in U.S. Pat. Nos. 3,954,915 and 3,867,295, to which reference is made for a description of such polymers, their preparation and utility.

The block copolymers described in U.S. Pat. Nos. 3,954,915 and 3,867,295 are intended for use in fuels and lubricants, e.g. as detergents and dispersants. As such, they were required to be soluble or dispersible in hydrocarbon and non-hydrocarbon oils, fuels and lubricants. To ensure this, the amount of the polar block was kept below 50% of the weight of the polymer, preferably 5 to 25%. By contrast, the block copolymers used in the present recovery methods are to be soluble in water, at least to an extent that they will be swollen by the water or form micelles that will thicken the water to the extent necessary for effective permeability control. Regardless of the actual solubility of the polymer in the water, polymrs of this kind which are either soluble in water or which are swollen by water to form pumpable gels are referred to in this application as being soluble in water and their mixtures with water as being aqueous solutions even if the polymers form micellar dispersions rather than true solutions.

In order to confer the requisite solubility, the amount of the polar units which in the present case, are derived from alkylene oxides, will generally be above 30% by weight of the polymer and more usually above 50% by weight although of solubility-enhancing groups such as sulfonate are present in the polymer, the proportion of polar units may be somewhat lower. Normally, however, the proportion of polar units will be 60 to 80% by weight of the polymer, although up to 99% by weight of these units may be present in the copolymer.

The materials used in the preparation of the polymers, e.g. alkyl styrene or mixtures of diene and styrene for the non-polar block, alkylene oxide for the polar block, solvents, anionic initiators, capping agents, etc. and the methods of preparation will be as described in U.S. Pat. Nos. 3,954,915 and 3,867,295 to which reference is made for details of such materials and methods, except, as mentioned above, the proportion of the polar and non-polar blocks will be appropriately modified to confer the desired solubility properties. Further, because solubility in organic liquids is not desired, the non-polar blocks may be derived from styrene itself as well as alkylstyrenes and diene-styrene mixtures. In such cases, styrene will be used in the same way in the polymer preparation as the described alkylstyrenes, with appropriate adjustment in weight amounts for the lower molecular weight.

Thus, in summary, the non-polar block A will be formed by anionic polymerization of styrene or an alkylstyrene optionally with a diene. The diene-derived copolymers may be hydrogenated prior to the addition of the polar component of block B. The preferred polar components for block B are alkylene oxides, e.g. ethylene oxide. Termination and hydrogenation of the diene units may be carried out as described in U.S. Pat. Nos. 3,954,915 and 3,867,295.

The desired molecular weights in the blocks and the final copolymer will generally be as previously described, but the weight of the polar block will generally be greater in order to confer the desired solubility in water. Thus, the polar block will generally have at least 200 and preferably at least 1000 alkylene oxide units, with a molecular weight of at least 50,000, typically 50,000 to 300,000 for the entire polymer.

In order to improve the solubility of the polymer in water, solubility enhancing groups such as sulfonate —SO₃H or —SO₃M may be added by treatment of the polymer with suitable reagents, e.g. by treating with sulfur trioxide the aromatic rings may be sulfonated and the acid sulfonic groups then neutralized with alkali, e.g. NaOH, KOH, NH₄OH. However, care should be taken not to use forcing conditions which would break up the polymer. The copolymers containing diene, e.g. butadiene segments in the non-polar block may be sulfonated on the diene units by the method described in U.S. Pat. No. 4,120,801 to which reference is made for a description of the method, which employs a liquid sulfur trioxide complex to sulfonate residual double bonds of the diene units with sulfonating the styrene ring. Alternatively, appropriately substituted styrenes or alkyl styrenes may be used as the monomers in the production of the original block copolymer.

If reactive groups, especially sulfonate, are present in the copolymer they may be converted to other solubilizing groups by conventional chemical reactions. For example, sulfonate groups may be hydrolyzed to hydroxyl groups, as described in U.S. Pat. No. 4,120,801, or chloromethlyl groups on the styrene unit may be quaternized by reaction with tertiary amines to form a quaternary nitrogen group. The reaction of copolymers with styrene units to form chloromethylated copolymers which are then quaternized by reaction with tertiary amines is described in U.S. Pat. No. 4,110,232, to which reference is made for details of these reactions.

The viscosifying effect of the polymers and the strength of the resultant aqueous gels may be enhanced by cross-linking the copolymers with polyvalent simple or complex cations, especially cations of aluminum, zirconium or a transition metal of the first series of transition metals (Sc—Zn). It is believed that the donor atoms present in the polar segments of the copolymers permit the cross-linkages to be formed by coordination with the cations. Because oxygen is a stronger donor than sulfur, the alkylene oxide-derived copolymers will be preferred when cross-linking is to be carried out. The preferred cations for cross-linking are simple or complex cations of chromium (III) and of aluminum, preferably the former. Cross-linking may be carried out in the conventional manner, as described, for instance, in U.S. Pat. Nos. 4,009,755, 4,069,869, 3,921,733, 4,257,903, 3,243,000, 3,383,307 and 3,810,882, to which reference is made for details of exemplary cross-linking agents and procedures. Generally, the cross-linking agent may be simply mixed with the copolymer solution, as described in these patents. In general, the amount of cross-linking agent used will be selected to give the desired solution viscosity and ultimate gel strength and will normally be from 10 to 100 ppm, preferably 10 to 50 ppm, as metal, e.g. as Cr (III).

The block copolymers are taken up in water, generally at concentrations of 100 to 10,000 ppm, generally 1000 to 2000 ppm, to provide the desired viscosity. The solution is then injected into the formation where it selectively blocks the more highly permeable regions, to control the subsequent flooding operation which may be carried out in the normal way. Injection of the solution into the formation may be carried out in the conventional way using an injection well which extends from the surface of the earth into the formation, e.g. as described in U.S. Pat. Nos. 4,078,607, 3,305,016, 4,076,074, 4,009,755 and 4,069,869, to which reference is made for descriptions of typical procedures. Briefly, the thickened aqueous liquid is injected into the formation through the injection well and in the formation it enters the more highly permeable stratum or strata in preference to the less permeable regions because of its viscosity. Once in place in the more highly permeable regions, the gel controls subsequent flooding operations by diverting the flood liquid, usually water, to the less permeable or "tight" zones, increasing recovery from these zones. The amount of the viscous solution which is injected into the reservoir will generally be from 10% to 100% of the pore volume of the high permeability stratum or strata.

Because the compositions of the block copolymers may be readily varied, e.g. by changing the ratio of the polar to the non-polar blocks, the viscosifying effects of the polymers may also be varied. The block polymers therefore offer the possibility of formulating polymers according to specific reservoir conditions.

Because the alkylene oxide block copolymers possess a viscosifying effect in aqueous soution, they may also be used for mobility control purposes in waterflooding operations. In carrying out waterflooding in this way, at least a portion of the water injected into the oil-bearing formation through the injection well contains the block copolymer in an amount which is sufficient to thicken the water and increase its viscosity to a point where it is closer to that of the oil, so as to increase the efficiency of the displacement of the oil from the formation. Normally, the amount of the copolymer should be sufficient to achieve a mobility ratio equal to or less than 1 for the reservoir oil to the injected water, as described in U.S. Pat. No. 3,025,237, to which reference is made. In many cases, the relative permeabilities of the reservoir to oil and water are discounted in arriving at the mobility ratio so that the desired viscosity of the thickened water will be at least that of the reservoir oil, typically in the range of 1 to 4 times that of the reservoir oil. Continued injection of the water drives the displaced oil through the formation to the production well from which it is recovered. In order to reduce the cost of the flood, it may be preferable to include the copolymer in only the initial portion of the flooding water; the concentration of the polymer may be decreased gradually or stepwise after the initial portion and the portion which is injected last may be free of the copolymer entirely. In this way, a progressive decrease in viscosity of the flood water is achieved.

I claim:

1. A method for controlling the permeability of a subterranean formation, which comprises injecting into the formation an aqueous solution of a block copolymer having polar and non-polar segments, the polar segment being derived from a polymerized alkylene oxide and the non-polar segment from styrene or an alkylstyrene, the polar segments constituting at least 30 weight percent of the copolymer, thereby forming a gel of a strength sufficient to block the high permeability regions of the formation selectively.

2. A method according to claim 1 in which the polar segment constitutes at least 50 weight percent of the copolymer.

3. A method according to claim 1 in which the polar segment constitutes from 60 to 99 weight percent of the copolymer.

4. A method according to claim 3 in which the polar segment constitutes from 60 to 80 weight percent of the copolymer.

5. A method according to claim 1 in which the non-polar segment comprises copolymerized styrene and diene units.

6. A method according to claim 1 in which the non-polar segment comprises polymerized alkylstyrene units.

7. A method according to claim 1 in which the non-polar segment comprises polymerized styrene units.

8. A method according to claim 1 in which the copolymer has solubilizing functional groups on the non-polar segment.

9. A method according to claim 8 in which the solubilizing functional groups are sulfonate groups.

10. A method according to claim 1 in which the copolymer comprises at least 1000 alkylene oxide units in the polar block.

11. A method according to claim 1 in which the copolymer has a molecular weight from 50,000 to 300,000.

12. A method according to claim 1 in which the solution contains 100 to 10,000 ppm of the copolymer.

13. A method according to claim 12 in which the solution contains 1,000 to 2,000 ppm of the copolymer.

14. A method according to claim 1 in which the copolymer is cross-linked by means of polyvalent metal ions.

15. A method according to claim 14 in which the copolymer is cross-linked by means of chromium (III) ions.

16. A method according to claim 14 in which the copolymer is cross-linked by means of complex chromium (III) ions.

* * * * *